Feb. 22, 1966  D. W. ROPER  3,236,346
SHEAR TYPE FLUID COUPLING
Filed May 15, 1963
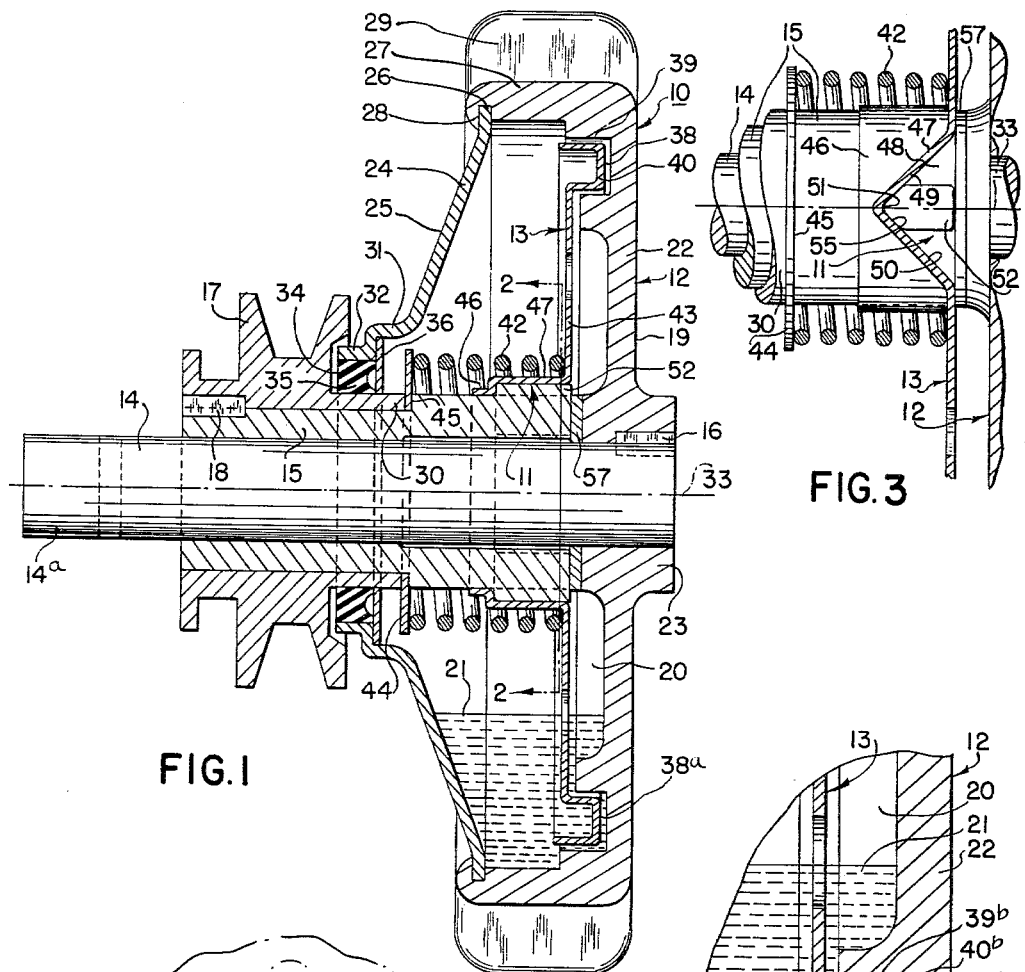
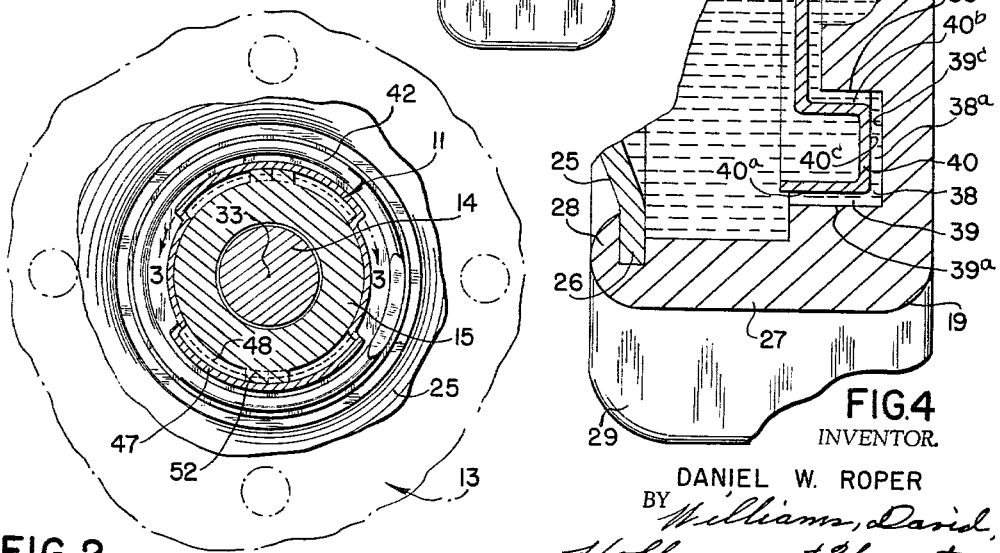
INVENTOR.
DANIEL W. ROPER
BY Williams, David,
Hoffmann & Yount
ATTORNEYS

United States Patent Office 3,236,346
Patented Feb. 22, 1966

3,236,346
SHEAR TYPE FLUID COUPLING
Daniel W. Roper, Rochester, Mich., assignor to Eaton Manufacturing Company, Cleveland, Ohio, a corporation of Ohio
Filed May 15, 1963, Ser. No. 280,677
7 Claims. (Cl. 192—58)

This invention relates to power transmitting couplings of the viscous shear fluid type and, more particularly, to a rotatable coupling of this type intended for the transmission of torque.

An object of this invention is to provide a novel rotatable coupling of the viscous shear fluid type and embodying rotation responsive means for automatically controlling or limiting the amount of torque being transmitted.

Another object is to provide such a novel torque-control coupling of the viscous shear fluid type in which rotation responsive cam means is employed to vary the effectiveness of a torque-transmitting film of the viscous fluid.

Still another object is to provide a novel torque-control coupling of the character above mentioned and in which the cam means is effective for either direction of torque transmitting rotation.

A further object is to provide a novel power transmitting coupling of the viscous shear fluid type having relatively rotatable coupling members mounted on power input and power output shaft members, and one of which coupling members is axially shiftable on its associated shaft member and relative to the other coupling member for varying the fluid shear driving area and/or for varying the torque-transmitting effectiveness of a shear fluid film therebetween, the axial shifting being produced by automatically operating cam means responsive to limited relative rotation between such one coupling member and its associated shaft member.

Additionally, this invention provides a novel viscous shear fluid coupling of the character hereinabove mentioned wherein the relatively rotatable coupling members comprise a housing having a chamber containing the viscous fluid and a rotor operable in such chamber, one of the coupling members having an axial annular projection and the other having an axial annular groove in which the projection is received for defining the gap for the fluid film, and the projection being subject to partial withdrawal from the groove by automatically acting control cam means for varying the shear area and/or for varying the gap and the torque-transmitting effectiveness of the fluid film therein.

Other objects, novel characteristics and advantages of this invention will be apparent in the following detailed description and in the accompanying drawings forming a part of this specification and in which, FIG. 1 is a vertical axial section taken through a rotatable coupling embodying this invention;

FIG. 2 is a partial transverse section taken adjacent the control cam means of the device as indicated by section line 2—2 of FIG. 1;

FIG. 3 is a fragmentary section taken as indicated by section line 3—3 of FIG. 2 and further illustrating the cam means; and FIG. 4 is a fragmentary sectional view corresponding with a portion of FIG. 1 and illustrating the film gap on a larger scale.

As representing one preferred embodiment of this invention, the accompanying drawings show a rotatable viscous shear fluid coupling 10 which is well suited for use in driving a device located adjacent a prime mover such as an electric motor, but which can also be used for numerous other power transmitting purposes. The coupling 10 embodies cam means 11 which is automatically operable to vary or control the effectiveness of a power transmitting film of the viscous shear fluid in the manner explained hereinafter.

The coupling 10 comprises, in general, a pair of relatively rotatable coupling members 12 and 13 associated with a pair of relatively rotatable shaft members 14 and 15. Either one of the shaft members 14 and 15 can be the power input member of the coupling 10 and the other shaft member the power output member. The shaft member 15 is here shown as being hollow, and the shaft member 14 is shown as being coaxial with and extending through the hollow shaft member 15 on a common rotation axis 33.

In the coupling 10, as here illustrated, the shaft member 14 is the power input member and the shaft member 15 is the power output member. An end portion 14$^a$ of the input shaft 14 projects from the hollow shaft member 15 and is suitably adapted for connection with the prime mover while the other end portion is connected with the coupling member 12 as by a key 16. A pulley 17 is adapted to be connected with the device to be driven and is secured on the output shaft 15 as by a key 18.

The coupling member 12 is in the form of a housing 19 having a chamber 20 adapted to contain viscous shear fluid 21 of a suitable character such as silicone oil. The housing 19 is provided with a front wall 22 having a central hub portion 23 by which the housing is mounted on the shaft member 14. The rear wall 24 of the housing is formed by a disk-like member 25 whose outer peripheral portion 26 is connected with an annular peripheral portion 27 of the housing 19. The connection between the peripheral portions 26 and 27 is here shown as formed by a bead 28 on the peripheral portion 27 and which has been spun over and against the peripheral portion 26. The peripheral portion 27 carries circumferentially spaced heat-dissipating radial blades 29.

The pulley 17 is here shown as having a sleeve projection 30 which surrounds the shaft member 15 and extends axially therealong for a short distance in a direction toward the chamber 20. The rear wall 24 has an annular central portion 31 terminating in a short axial sleeve 32 which is disposed around, but spaced from, the pulley sleeve 30. A sealing means 34 is provided for retaining the fluid 21 in the chamber 20 and is here shown as comprising a suitable packing ring 35 in the space between the sleeves 30 and 32 and a radially disposed cover ring 36 engaged by the inner end of the packing ring.

The coupling members 12 and 13 have co-operating portions in an adjacent relation so as to define an annular gap 38 in which a portion of the fluid 21 forms a power transmitting film 38$^a$ between the coupling members. As such co-operating portions one of the coupling members, in this case the coupling member 12, is provided with an axial annular groove 39 adajacent its peripheral portion 27, and the other coupling member 13 is provided with an axial annular projection 40 adjacent the outer periphery thereof which is received in the groove 39.

The intervening space between the walls of the groove 39 and the projection 40 forms the gap 38 and, in this case, is of a substantialy U-shaped cross-section as shown in FIGS. 1 and 4. During rotation of the housing 19 some of the fluid 21 is distributed by centrifugal force around the groove 39 and forms the torque-transmitting film 38$^a$ in the gap 38 for transmitting torque from the power input coupling member 12 to the power output coupling member 13. The scope of this invention is not limited to the provision of a single projection and groove and it is anticipated that a plurality of such projections and grooves could be used.

The groove 39 has outer and inner annular side walls providing shear surfaces 39$^a$ and 39$^b$. The projection 40 has outer and inner annular side walls providing shear surfaces 40ª and 40ᵇ which are located opposite the shear surfaces 39ª and 39ᵇ and are spaced radially from the latter by portions of the U-shaped gap 38 (see FIG. 4). The groove 39 also has an annular end wall providing a shear surface 39ᶜ, and the projection 40 has an annular end wall providing a shear surface 40ᶜ which is spaced axially from the shear surface 39ᶜ by another portion of the gap 38.

A compression spring 42 disposed around the shaft member 15 normally urges the coupling member 13 axially toward the coupling member 12, that is, in a direction for decreasing the width and effective cross-sectional area of the gap 38. The spring 42 also resists withdrawal of the projection 40 from the groove 39. The inner end of the spring 42 is seated against an inner disk portion 43 of the coupling member 13, and the outer end of the spring engages a washer 44 as a spring seat. The washer 44 is clamped between the pulley sleeve 30 and an annular shoulder 45 of the shaft member 15.

The control cam means 11 is provided between one of the coupling members and its associated shaft member, in this case, between the coupling member 13 and the associated power output shaft member 15. As forming a part of this cam means 11, the coupling member 13 is provided with a central axial sleeve 46 projecting from the disk portion 43 centrally of the latter. The sleeve 46 has limited rotation relative to the associated shaft member 15 and is the means by which the coupling member 13 is mounted on this shaft member. At circumferentially spaced points therearound, in this case at two diametrically opposed points, the sleeve 46 is provided with hollow cam members 47 defining recesses 48 which are open on the axial side thereof facing the front wall 22 of the coupling member 12. Each such hollow cam member 47 comprises oppositely inclined cam walls or surfaces 49, 50 which are here shown as being inclined at an angle of approximately 45 degrees relative to the rotation axis 33 so that the recesses 48 are substantially V-shaped, as shown in FIG. 3, and each recess includes an apex 51 at the closed end thereof.

At corresponding circumferentially spaced points the shaft member 15 is provided with cam lugs 52 which are located in the recesses 48 and co-operate with the cam surface 49 and 50, depending upon the direction of relative rotation between the coupling member 13 and the shaft 15.

The spring 42 normally urges the coupling member 13 axially along the shaft member 15 in a direction toward the right as seen in FIGS. 1 and 3, so that the cam surfaces 49 and 50 of the V-shaped recesses 48 engage against and embrace the adjacent inner ends of the cam lugs 52. The cam lugs 52 each have a convexly curved surface contour 55 at the inner end thereof which imparts sliding and wedging thrust against one or the other of the inclined cam surfaces 49 and 50 in response to rotation of the shaft member 15 relative to the coupling member 13.

Thus, when relative rotation occurs in one direction between the shaft member 15 and the coupling member 13, the curved lug portions 55 will push against the inclined cam surfaces 49 whereby the coupling member 13 will be cammed axially in a direction away from the front wall 22. Likewise, when relative rotation occurs in the opposite direction, the curved lug portions 55 will push against the other inclined cam surfaces 50 for similarly camming the coupling member 13 in a direction away from the front wall 22.

As shown in FIGS. 1 and 3, a washer 57 is preferably provided between the hub portion 23 of the coupling member 12 and the inner end of the shaft member 15 for location purposes. When the cam lugs 52 are in wedging co-operation with one or the other of the cam surfaces 49, 50 for pushing the coupling member 13 away from the front wall 22, the thrust reaction is taken by the shaft 15. From the above description, it should be apparent that the shaft 15 has a fixed axial relationship with respect to coupling member 12.

Axial shifting of the coupling member 13 in a direction away from the front wall 22 by the cam means 11 in the manner just explained above, will cause a withdrawal or partial withdrawal of the projection 40 of the coupling member 13 from the groove 39 of the coupling member 12. Such retraction or withdrawal of the projection 40 from the groove 39 will produce an opening or widening of the gap 38 for the portion thereof between the surfaces 39ᶜ and 40ᶜ and will also decrease the axial shear area overlap of the pairs of radially spaced surfaces 39ª, 40ª and 39ᵇ, 40ᵇ. A return axial movement of the projection 40 into the groove 39 by the action of the spring 42 will produce a closing or narrowing of the gap portion between the surfaces 39ᶜ and 40ᶜ and will also increase the axial shear area overlap of the pairs of surfaces 39ª, 40ª and 39ᵇ, 40ᵇ.

Such increase in gap width and decrease in shear area overlap will decrease the torque-transmitting capability of the film 38ª of viscous fluid present in the gap in proportion to the gap width increase and shear area decrease. Similarly, a narrowing of the gap width and increase in shear area overlap will increase the torque-transmitting capability of the film 38ª in proportion to the gap width decrease and shear overlap area increase.

During the operation of the coupling 10 the power input applied to the shaft 14 rotates the coupling member 12 mounted thereon. The coupling member 13 is driven by the coupling member 12 through the film 38ª of viscous fluid in the gap 38. The film thus transmits torque from the coupling member 12 to the coupling member 13 for delivery to the output shaft 15 through the cam means 11. Rotation of the output shaft 15 and the coupling member 13 is resisted by the device or load to be driven with which the pulley 17 is connected and more or less shearing of the film 38ª will take place.

When the resistance to rotation of the output shaft 15 is of such magnitude that the coupling member 13 is rotated relative to this shaft member, the cam lugs 52 will be effective against one or the other of the inclined cam surfaces 49, 50 of the cam means 11 to impart the above-explained axial shifting to the coupling member 13 for causing the partial withdrawal of the projection 40 from the groove 39. The partial withdrawal of the projection 40 from the groove 39 decreases the torque-transmitting capability of the fluid film 38ª in the manner already explained above. Under these circumstances, an increased amount of slippage takes place between the coupling members 12 and 13 and the amount of torque being delivered through the shaft 15 is correspondingly limited or maintained substantially constant. The cam means 11 will therefore be automatic in its operation for controlling and limiting the amount of torque to be transmitted through the fluid film in the gap 38 and delivery of an excessive or overload torque by the output shaft 15 will be prevented.

In keeping with the construction and functioning described above for the clutch 10, it will be seen that a positional relationship exists for the members, with respect to the direction or path of torque transmission, in which the power input shaft member 14 and the power output shaft member 15 are first and second members, respectively, and the coupling member 13 is an intermediate member which is axially shiftable by the cam means 11.

The dimensional values and other characteristics of the coupling 10 and the components thereof will depend upon the torque rating and the kind of service for which the coupling is intended. Since the coupling 10 is comprised of a relatively small number of parts, it can be readily built or adapted to suit the particular location and service for which it is to be used.

From the accompanying drawings and the foregoing detailed description it will now be readily understood that this invention provides a novel rotatable coupling of the viscous shear fluid type which is of a very simple and practical construction and which will operate in a highly satisfactory manner at variable speeds and under variable temperature conditions. It will now also be seen that this novel coupling embodies cam means which operate automatically to vary the width of the fluid gap and the effective area of the shear surfaces for relieving a torque overload regardless of the direction of clutch rotation, and which automatically restores the gap and fluid film to a normal condition when the overload is removed.

Although the rotatable coupling of this invention has been illustrated and described herein to a somewhat detailed extent, it will be understood, of course, that the invention is not to be regarded as being correspondingly limited in scope but includes all changes and modifications coming within the terms of the claims hereof.

Having described my invention, I claim:

1. A coupling apparatus comprising a pair of relatively rotatable coupling members, one being a housing member having a chamber and the other being a rotor member operable in said chamber, cooperative portions on said housing and rotor members including axially spaced opposed shear surfaces in a side-by-side relation and radially spaced opposed shear surfaces in an overlapping relation, a viscous shear fluid in said chamber including fluid in the space between said axially and radially spaced shear surfaces and cooperable with said axially and radially spaced surfaces to transmit torque therebetween, one member of said pair being axially shiftable relative to the other member for simultaneously varying the distance between the axially spaced shear surfaces and the amount of overlapping of the radially spaced shear surfaces and thereby varying the torque transmitted by said shear surfaces, and means for effecting axial shifting of said one member axially away from the other member in response to a torque overload condition to effect simultaneously a widening of the gap between said axially spaced shear surfaces and a decrease in the area of overlap of said radially spaced shear surfaces whereby the torque transmitted by said shear surfaces and thus the torque output is decreased.

2. A coupling apparatus comprising a pair of relatively rotatable coupling members, one being a housing member having a chamber and the other being a rotor member operable in said chamber, one of said members having wall means defining an axially extending annular groove therein, the other of said coupling members having a projection thereon received in said groove, said projection and wall means including axially spaced opposed first shear surfaces in a side-by-side spaced substantially parallel relation and radially spaced opposed second shear surfaces in an overlapping substantially parallel relation, a viscous shear fluid in the space between said radially and axially spaced shear surfaces and cooperable with said radially and axially spaced shear surfaces to transmit torque therebetween, one member of said pair being axially shiftable relative to the other member for simultaneously varying the axial distance between the axially spaced shear surfaces and the amount of overlapping of the radially spaced shear surfaces and thereby varying the torque transmitted by said shear surfaces, and means for effecting axial shifting of said one member away from the other member in response to a torque overload condition to simultaneously effect a widening of the gap between said axially spaced shear surfaces and a decrease in the area of the overlapping of said radially spaced shear surfaces whereby the torque transmitted by said shear surfaces and thus the torque output is decreased.

3. A coupling apparatus comprising a pair of relatively rotatable coupling members, one being a housing member having a chamber and the other being a rotor member operable in said chamber, said housing member having wall means defining an axially extending annular groove, said rotor member having a projection thereon received in said groove, said projection and wall means including axially spaced opposed first shear surfaces in a side-by-side spaced substantially parallel relation and radially spaced opposed second and third shear surfaces in an axial overlapping substantially parallel relation, a viscous shear fluid in the space between said shear surfaces and cooperable with said shear surfaces to transmit torque therebetween, said rotor member being axially shiftable relative to said housing member for simultaneously varying the distance between the axially spaced shear surfaces and the amount of overlapping of the radially spaced shear surfaces and thereby varying the torque transmitted by said shear surfaces, and means for effecting said axial shifting of said rotor member away from said housing member in response to a torque overload condition to simultaneously effect a widening of the space between said axially spaced surfaces and a decrease in the area of overlapping of said radially spaced shear surfaces whereby the torque transmitted by said shear surfaces and thus the torque output is decreased.

4. A coupling apparatus comprising a pair of relatively rotatable coupling members, one being a housing member having a chamber and the other being a rotor member operable in said chamber, a rotary drive member supporting said rotor member for rotation and axial shifting relative thereto, said housing member having wall means defining an axially extending annular groove, said rotor member having a projection thereon received in said groove, said projection and wall means including axially spaced opposed first shear surfaces in a side-by-side spaced substantially parallel relation and radially spaced opposed second shear surfaces in an axial overlapping substantially parallel relation, a viscous shear fluid in the space between said shear surfaces and cooperable with said shear surfaces to transmit torque therebetween, said rotor member being axially shiftable relative to said housing member for simultaneously varying the distance between the axially spaced shear surfaces and the amount of overlapping of the radially spaced shear surfaces and thereby varying the torque transmitted by said shear surfaces, and cam means responsive to relative rotation between said rotary drive member and said rotor member for effecting said axial shifting of said rotor member away from said housing member in response to a torque overload condition to simultaneously effect a widening of the space between said axially spaced surfaces and a decrease in the area of overlapping of said radially spaced shear surfaces whereby the torque transmitted by said shear surfaces and thus the torque output is decreased.

5. A coupling apparatus comprising a pair of relatively rotatable and relatively axially shiftable coupling members, one being a housing having a chamber and the other being a rotor operable in said chamber, cooperating annular portions of said housing and rotor being normally in a relatively close cooperative relation and separated by an intervening annular film-forming gap, viscous shear fluid in said chamber including fluid in said gap for forming a film therein to transmit torque from one to the other of said coupling members, rotatable power input and power output members one of which is connected with said housing and the other having said rotor axially shiftable thereon in opposite directions for increasing and decreasing the torque-transmitting capability of said film, said cooperating annular portions of said housing and rotor comprising axial annular groove means on one coupling member and axial annular projection means on the other coupling member and received in said groove means, said groove means and projection means having axially opposed first shear surfaces and radially spaced other shear surfaces in axial overlap relation, spring means normally acting to produce axial shifting of said rotor in the direction to decrease the gap width between said first shear surfaces and to increase the axial overlap area between said radially spaced shear surfaces, said rotor being capable of limited rotation relative to the other of said power members in response to torque overload, and thrust means responsive to said limited relative rotation for causing the axial shifting of said rotor in the other direction and a withdrawal movement of said projection means relative to said groove means for increasing the gap width between said first shear surfaces and decreasing the axial overlap area between said other shear surfaces to automatically relieve the torque overload.

6. An apparatus as defined in claim 5 wherein said power input and power output members are coaxial and coextensive and said spring means comprises a coil spring encircling the power input and power output members and said thrust means comprises a cam member fixed to said power output member and said rotor includes a cam portion biased into engagement with said cam member and cooperable therewith to effect said axial shifting of said rotor member.

7. A coupling apparatus comprising a pair of relatively rotatable and relatively axially shiftable coupling members, one being a housing having a chamber and the other being a rotor operable in said chamber, cooperating annular portions of said housing and rotor being normally in a relatively close cooperative relation and separated by an intervening annular film-forming gap, viscous shear fluid in said chamber including fluid in said gap for forming a film therein to transmit torque from one to the other of said coupling members, rotatable power input and power output members, one of which is connected with said housing and the other having said rotor axially shiftable thereon in opposite directions for increasing and decreasing the torque-transmitting capability of said film, spring means normally acting to produce axial shifting of the rotor in a direction to increase the torque-transmitting capabilities thereof, said power input and power output members being coaxial and coextensive and said spring means comprising a coil spring encircling said power input and power output members, said rotor being capable of limited rotation relative to the other of said power members in response to torque overload, and thrust means responsive to said limited relative rotation for causing the axial shifting of said rotor in the other direction to decrease the torque-transmitting capabilities thereof, and said thrust means comprising a cam member fixed to the other of said power members and said rotor including a cam portion biased into engagement with said cam member by said spring and cooperable therewith to effect said axial shifting of said rotor member upon relative rotation thereof.

References Cited by the Examiner

UNITED STATES PATENTS

| | | |
|---|---|---|
| 1,238,447 | 8/1917 | Severy. |
| 2,313,132 | 3/1943 | Elliott. |
| 2,838,244 | 6/1958 | Oldberg. |
| 3,066,780 | 12/1962 | Blau. |
| 3,071,225 | 1/1963 | Blau et al. |

DON A. WAITE, *Primary Examiner.*

DAVID J. WILLIAMOWSKY, *Examiner.*